United States Patent [19]

Winzer et al.

[11] 4,441,181

[45] Apr. 3, 1984

[54] OPTICAL WAVELENGTH-DIVISION MULTIPLEX SYSTEM

[75] Inventors: Gerhard Winzer, Munich; Hans Mahlein; Achim Reichelt, both of Unterhaching, all of Fed. Rep. of Germany

[73] Assignee: Siemens Aktiengesellschaft, Berlin & Munich, Fed. Rep. of Germany

[21] Appl. No.: 303,093

[22] Filed: Sep. 17, 1981

[30] Foreign Application Priority Data

Oct. 6, 1980 [DE] Fed. Rep. of Germany ....... 3037712

[51] Int. Cl.$^3$ .............................................. H04J 1/02
[52] U.S. Cl. ..................................... 370/3; 370/123; 350/96.19
[58] Field of Search ...................... 370/3, 1, 69.1, 123; 350/96.15, 96.16, 96.17, 96.18, 96.19

[56] References Cited

U.S. PATENT DOCUMENTS 1,617,392  2/1927  Jammer ............................... 370/123
4,198,117  4/1980  Kobayashi ......................... 350/96.19

OTHER PUBLICATIONS

"Wavelength–Division Multiplex Transmission over Multimode Optical Fibers: Comparison of Multiplexing Principles" by Winzer et al., Siemens Forsch-U. Entwickl.-Ber. Bd. 9 (1980) NR. 4.
A. Reichelt, "Low-Loss Lenseless Wavelength-Division Multiplexers" Proc. 6th Europ. Conf. Optical Comm., Sep., 16-19, 1980, York England, *IEE Conference Publication No. 190* (1980) pp. 294-297 K.
Kobayashi et al., "Microoptic Grating Multiplexers and Optical Isolators for Fiber–Optic Communications" *IEEE Journal of Quantum Electronics*, vol. QE-16, No. 1, Jan. 1980, pp. 11-22.
H. F. Mahlein "Designing of Edge Interference Filters for Wavelength–Division Multiplex Transmission over Multimode Optical Fibers" *Siemens Forsch.-u Entwickl.-Ber* vol. 9, No. 3, 1980 p. 142-150.

*Primary Examiner*—Douglas W. Olms
*Attorney, Agent, or Firm*—Hill, Van Santen, Steadman & Simpson

[57] ABSTRACT

An optical wavelength division multiplex system having a multiplexer unit, a demultiplexer unit and means for forming a transmission path between the two units characterized by each of the multiplexer and demultiplexer units being composed of at least two reflecting grating modules interconnected by at least one interference module which reflection and interference modules of each unit are matched to one another. The system enables increasing the number of transmission channels with different carrier wavelengths while the insertion losses are maintained in an acceptable range.

16 Claims, 2 Drawing Figures

OPTICAL WAVELENGTH-DIVISION MULTIPLEX SYSTEM

BACKGROUND OF THE INVENTION

The present invention is directed to an optical wavelength-division multiplex system.

Optical multiplexers and demultiplexers are required for optical message transmission in wavelength-division multiplex systems. Such a system enables simultaneous transmission via a single optical fiber of a plurality of modulated radiation of different wavelengths which are from a plurality of different light sources having different wavelengths.

Up until now, interference filter arrangements or grating arrangements have been employed for the realization of the multiplexers and demultiplexers. The selection of which of these two types of arrangements would be used would depend upon the particular type of light source being utilized, such as the luminescent diodes and laser diodes, the plurality of wavelength channels to be transmitted and their channel spacing. Since interference filter arrangements have favorable values for insertion loss and cross-talk attenuation and can be simple and compactly designed according to the beam division principle, they are preferred in those systems which utilize a few channels and uses luminescent diodes as the transmitters. These advantages were discussed in a paper by A. Reichelt et al, "Low-Loss Lensless Wavelength-Division Multiplexers", *Conference on Optical Communication*, York, IEE Conference Publication No. 190 (1980) pages 294–297. Interference filter arrangement as a multiplexer or demultiplexer with eight channels could only be realized with a very high cost. Yet on the basis of line width of the luminescent diodes, at the most seven channels could be realized in the wavelength range of 700 nm through 1.6 $\mu$m and are available for optical message transmissions via fiber optical waveguides.

For the realization of many wavelength channels, laser diodes in conjunction with a reflection grating can be employed. In the meantime, multiplexer or respectively the demultiplex modules with a reflection grating arrangement for laser diodes have been utilized with ten channels. Meaningful channel spacing for a wavelength range or band around $\lambda = 850$ nm are approximately $\Delta\lambda = 20$ nm and for a wavelength around a band of $\lambda = 1.3$ $\mu$m approximately $\Delta\lambda = 35$ nm. These have been pointed out by K. Kobayashi et al "Microoptic Grating Multiplexers and Optical Isolators for Fiber-Optic Communications", *IEEE Journal of Quantum Electronics*, Vol. QE-16, No. 1, January 1980, pages 11–22. A value of approximately 30 channels would therefore be the upper limit for the number of channels. This number however presumes that adequate laser diodes, which are uniformly distributed over the total available wavelength range, are available. The construction of a multiplexer or respectively a demultiplexer module with a single reflection grating seems to be an extremely challenging technological problem for this estimated number of channels. What is more realistic for this variation of a multiplexer or respectively demultiplexer module is to assume to interpret the specifications "many wavelength channels" to be a plurality of approximately 15. When reflection grating multiplexer or respectively demultiplexer modules are employed for more than eight channels, a strong fluctuation of the insertion losses occurs due to the wavelength dependency of the diffraction efficiency (blaze angle) and high insertion losses occur for the fibers with great spacing from the optical axis as a result of the imaging defects.

SUMMARY OF THE INVENTION

The present invention is directed to increasing the plurality of transmission channels with different carrier wavelengths for an optical wavelength division multiplex system over the known number of channels.

This object is inventively achieved by an improvement in an optical wavelength-division multiplex system comprising a multiplexer unit, a demultiplexer unit and means for forming a transmission path between the units. The improvement comprises that each of the multiplexer unit and demultiplexer unit are formed by at least two reflection grating modules and at least one interference filter module and that the modules in each unit are matched to one another. Thus, an increase in the number of channels is possible without having the insertion losses increase at the same time to an unbearable degree.

In an embodiment of the invention, the individual fiber of the means for forming transmission paths extends between the interference filter module of each of the units which interference filter module has at least three fiber ports and each of the reflection grating modules of the multiplexer unit have a plurality of input fiber ports and a single output fiber port and each of the reflection grating modules of the demultiplexer unit have a plurality of output fiber ports and a single input fiber port. Thus, the single fiber means for forming a transmission path is fanned tree shape at the first interference filter module and the additional fanning occurs between the first filter modules and the next modules which may be filter modules or grating modules.

It is expedient that the output fibers of each of the reflection grating modules of the multiplexer unit, the input fibers of each of the grating modules of the demultiplexer unit and the fibers of each of the interference filter modules of both units are identical to the type of fiber used by the means for forming a transmission path between the two units. This identity is in the index of refraction, the numerical aperture and the core diameter.

In contrast thereto, the input fibers to the reflection grating modules of the multiplexer are generally selected with a smaller core diameter and a smaller numerical aperture than the remaining fibers of the system. Also the output fibers of each of the reflection grating modules of the demultiplexer have a greater core diameter and a larger numerical aperture than the other fibers of the system.

It is advantageous in the selected arrangement that the wavelength spacing between two wavelength bands, which are coupled to the individual fiber of the means forming a transmission path of from the two reflective gratings and via the interference cut-off filter module can be randomly selected as long as the edge steepness of the interference filter module allows. It is also noted that if each of the reflection grating modules can handle N channels, a multiplexer-demultiplexer system for 2 N channels will utilize two reflection grating modules with a single interference module for each unit. However if the multiplex-demultiplex system is to handle 4 times N channels then each unit will consist of four grating reflection modules and three interference modules.

DESCRIPTION OF THE PREFERRED EMBODIMENTS

Figure 1:
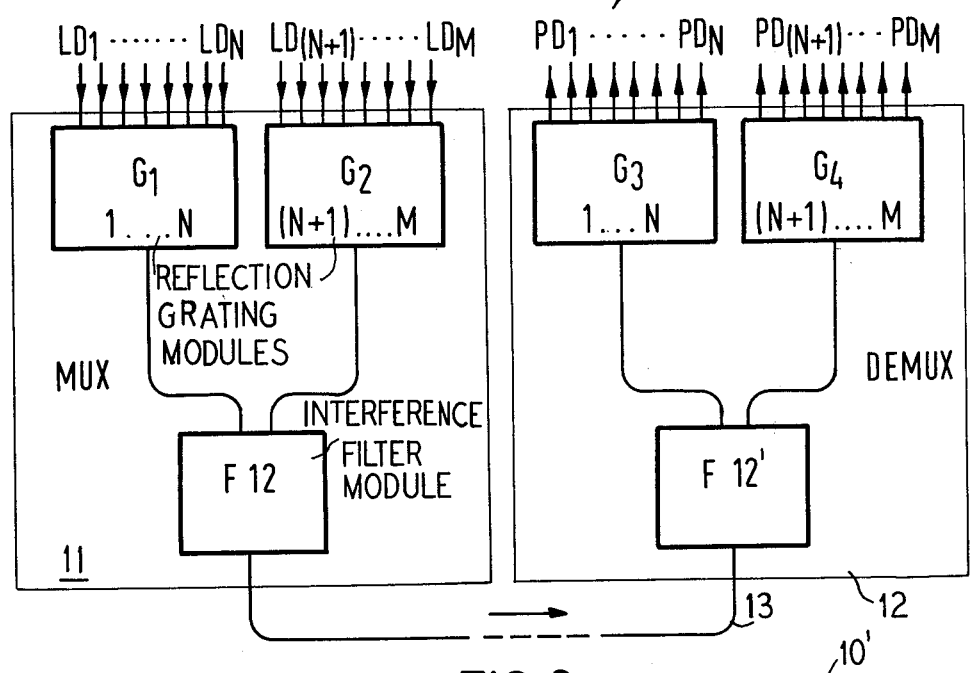
FIG. 1 diagrammatically shows an optical wavelength division multiplex system utilizing grating modules and interference filter modules in accordance with the present invention.

The principles of the present invention are particularly useful in an optical wavelength-division multiplex system generally indicated at 10. The system 10 includes a multiplexer unit 11 and a demultiplexer unit 12 which are interconnected by means 13 for forming transmission paths therebetween. It should be noted that the means 13 includes a single communications optical fiber extending into each of the units 11 and 12.

An increase in the number of channels for an optical wavelength division-multiplex system is possible when the system is constructed with mutually matched reflection grating modules and interference filter modules for the multiplexer unit 11 and also the demultiplexer unit 12 has mutually matched reflection grating and interference filter modules. Thus, the interference filter module for both units causes a tree-shaped fanning of the individual fiber of the means 13 at both ends of the transmission path. Thus, the single port at each end of the path will be expanded in two or respectively four fiber ports. These fiber ports are further multiplied by means of the reflection grating modules of the respective units.

In the system 10, the multiplexer unit 11 is illustrated as having two reflection grating modules G1 and G2 which are different blazed reflection grating for two wavelength bands and one interference cut-off filter module F12. In a similar manner, the demultiplex unit 12 has an interference cut-off filter or module F12' which has two fiber ports connected to two reflection grating modules G3 and G4 which also have different reflection gratings for two wavelength bands.

As illustrated in FIG. 1, each of the input optical fibers for the reflection grating modules G1 and G2 are connected to individual laser diodes which are spectrally graduated. These laser diodes are indicated as LD1-LDN for channels 1 to N in the module G1 and LD(N+1) through LDM for channels (N+1) to M of the module G2. The output fibers of the two modules G1 and G2 extend to two input ports for the interference module F12. In a similar manner, the demultiplex unit 12 has an interference module F12' which has two outputs which are input fibers for the reflection grating modules G3 and G4. The module G3 will have channels 1 to N while the module G4 has channels (N+1) to M. Each of the output channels of the modules G3 and G4 for the demultiplexer are connected by output fibers to receving diodes such as PD with PD1−PDN being connected to the channels 1 to N of the module G3 and PD (N+1) to PDM being connected to the channels N+1 to M of the module G4.

The channels 1 through N of the module G3 and the channels N+1 through M of the module G4 each conduct light of adjacent wavelengths. For example, in a band I, the light of the laser diodes will have for example the following emission wavelengths.

$\lambda_1 = 750$ nm
$\lambda_2 = 780$ nm
$\lambda_3 = 810$ nm
$\lambda_4 = 840$ nm
$\lambda_5 = 870$ nm and
$\lambda_6 = 900$ nm.

In this example, the wavelengths spacing or channel spacing amounts to $\Delta\lambda = 30$ nm. The dimensioning rules for a reflection grating module of a multiplexer and/or demultiplexer unit are known for given fiber parameters, which were mentioned in the above cited publication by K. Kobayashi et al. Given the center wavelength $\lambda_{BI}$ and a grating constant $d_I$, the blazed angle $v_I$ derives from the sine $v_I = \lambda_{BI}/2d_I$. For the center wavelength $\lambda_{BI} \approx (\lambda_1 + \lambda_6)/2$ is to be selected. In the wavelength band II given for example, a greater channel spacing of $\Delta\lambda = 40$ nm, the light of the laser diodes will have, for example, emission wavelengths of $\lambda_7 = 1220$ nm,
$\lambda_8 = 1260$ nm,
$\lambda_9 = 1300$ nm,
$\lambda_{10} = 1340$ nm,
$\lambda_{11} = 1380$ nm and
$\lambda_{12} = 1420$ nm.

The light of the laser diodes of the second band II can be combined with a second reflection grating module G2 and separated by a second demultiplexer reflection grating module G4 of the demultiplexer unit 12. Given a grating G2, the blaze angle. $v_2$, the grating constant dII, the center wavelength is fixed at $\lambda BII \approx (\lambda_7 + \lambda_{12})/2$. The light of the output fibers of both grating modules G1 and G2 of the multiplexer unit 11 are combined by the interference filter module F12. Given the selected example with M=12, the edge of the interference cut off filter F12 is placed in the wavelength center i.e. at $\lambda_K$ which is approximately $(\lambda_6 + \lambda_7)/2$. Given a long wave pass filter, the light of the channels 1 through N is coupled into the interference filter module of the multiplexer by a reflection channel and the light of the channels (N+1) through M is coupled in via the transmission channel. The channels are to be interchanged when the interference filter module of the multiplexer utilizes a short wave pass filter. The structure of the interference filter module and the reflection grating modules of the demultiplexer unit 12 are entirely analogous.

Figure 2:
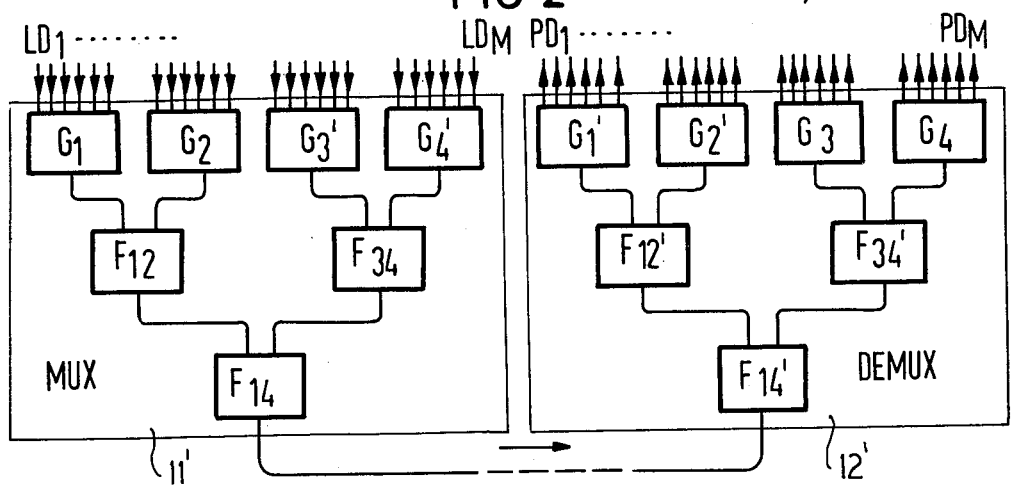
FIG. 2 diagrammatically illustrates an optical wavelength division multiplex system of the system of FIG. 1 for twice as many channels.

An embodiment of the system is indicated at 10' in FIG. 2 and has a multiplexer unit 11' and demultiplexer unit 12'. The unit 11' has four different reflection grating modules G1, G2, G3', G4' and three different interference cut-off filter modules F12, F34 and F14. In a similar manner, the demultiplexer unit 12' has three interference filter units F12', F34' and F14' and four reflection grating modules G1', G2', G3 and G4.

Given the system 10' of FIG. 2, the light of the four channel groups is transmitted via a single fiber path with the same number of channels M/4. Given seven respective channels upon employment of four different reflection grating G1, G2, G3' and G4' and three different interference cut-off filter modules, F12, F34 and F14, it is even possible that the number of channels M is close to the limit of what can be achieved in the available wavelength range that can be utilized with the arrangement. With respect to their spectral position, the cut-off filter modules are then graduated in such a manner that $\lambda_K$(F14) lies in the center between $\lambda_K$(F12) and $\lambda_K$(F34).

The insertion attenuation $a_{sF}$ of the interference filter modules of both the multiplexer unit and the demultiplexer unit lie below 2dB because they only contain cut-off edge filters and no additional band filters. Given the reflection grating modules for both the multiplexer and demultiplexer units, one can likewise count an insertion attenuation of $a_{sG} \approx 2dB$ since the number of channels of each of the individual grating modules remains low. Upon transversal of the elements of the first system 10 of FIG. 1, the overall additional losses are $a_s = 2a_{sG} + 2a_{sF} \approx 8dB$ for the multiplexer unit and the demultiplexer unit. In a transversal of the elements in the second system 10' of FIG. 2, additional losses $a_s = 2a_{sG} + 4a_{sF} \approx 12dB$ will be derived.

In comparison to systems which would exclusively use reflection grating modules for multiplexing and demultiplexing, it is to be considered that more channels can be realized with the arrangement proposed in the system hereinabove. Thus, the transmission capacity of the fiber path can be better exploited.

Details concerning the particular interference filter modules which can be utilized in the system in the present invention are found in H. F. Mahlein, "Designing of Edge Interference Filters for Wavelength-Division Multiplex Transmission Over Multimode Optical Fibers", *Siemens Forsch.-u. Entwickl. -Ber.* Vol. 9, 1980, No. 3, pages 142–150. Thus, the unit or modules such as the interference filter modules can be conventionally known modules. In addition the reflection grating modules can also be known conventional modules as pointed out by the above cited articles.

Although various minor modifications may be suggested by those versed in the art, it should be understood that I wish to embody within the scope of the patent granted hereon, all such modifications as reasonably and properly come within the scope of my contribution to the art.

We claim:

1. In an optical wavelength-division multiplex system with a multiplexer unit, a demultiplexer unit, and means for forming a transmission path between the two units, the improvement comprising both the multiplexer unit and the demultiplexer unit each having a plurality of modules including at least a reflection grating module and an interference filter module, the reflection grating modules and interference filter modules of each unit being matched to one another and each unit having at least one reflection grating module and at least one interference filter module being connected in series in a random sequence.

2. In an optical wavelength-division multiplex system according to claim 1, wherein each of the interference filter modules comprises an interference cut-off filter with a high edge steepness.

3. In an optical wavelength-division multiplex system according to claim 1, wherein the reflection grating modules of the multiplexer unit has input fibers which have a smaller core diameter and a smaller numerical aperture than the remaining fibers of the system, and the reflection grating modules of the demultiplexer unit have output fibers with a larger core diameter and a higher numerical aperture than the other fibers of the system.

4. In an optical wavelength-division multiplex system according to claim 1, wherein the means for forming a transmission path between the units includes system fibers, and wherein the interference filter modules for both the multiplexer unit and the demultiplexer unit have filters which are identical to the system fiber type, wherein the each reflection grating module of the multiplexer unit have output fibers which are identical to input fibers of the reflection grating modules of the demultiplexer unit and to both the fibers of the interference filter modules and the system fibers.

5. In an optical wavelength-division multiplex system according to claim 4, wherein each of the reflection grating modules of the multiplexer unit has input fibers which have a smaller core diameter and smaller numerical aperture than the remaining fibers of the system, and each of the reflection grating modules of the demultiplexer unit have output fibers which have a larger core diameter and a higher numerical aperture than the other fibers of the system.

6. In an optical wavelength-division multiplex system according to claim 1, wherein each of the reflection grating modules of the multiplexer unit has a plurality of input ports having input fibers and a single output port with an output fiber, each of the reflection grating modules of the demultiplexer unit has a single input port with a single input fiber and a plurality of output ports with output fibers, each of the interference filter modules having at least three fiber ports with one of the fiber ports being connected to a system fiber of the means for forming a transmission path and the other two ports being connected by fibers extending to the reflection grating modules.

7. An optical wavelength-division multiplex system according to claim 6, wherein the input fibers of each of the reflection grating modules of the multiplexer unit have a smaller core diameter and a smaller numerical aperture than the remaining fibers of the system and wherein the output fibers of the reflection grating modules of the demultiplexer unit have a larger core diameter and a higher numerical aperture than the remaining fibers of the system.

8. An optical wavelength-division multiplex system according to claim 6, wherein the fibers of the interference filter modules of both the multiplexer unit and the demultiplexer unit, the input fibers of the reflection grating modules of the demultiplexer and the output fibers of the reflection grating modules of the multiplexer unit are identical to the system fiber utilized by the means for forming a transmission path.

9. In an optical wavelength-division multiplex system according to claim 8, wherein the input fibers for each of the reflection grating modules of the multiplexer unit have a smaller core diameter and smaller numerical aperture than the remaining fibers of the system and wherein the output fibers of each of the reflection grating modules of the demultiplexer unit have a larger core diameter and a higher numerical aperture than the remaining fibers of the system.

10. In an optical wavelength-division multiplex system according to claim 1, wherein the multiplexer unit and the demultiplexer unit each consists of at least four reflection grating modules and three interference filter modules with a pair of the interference filter modules being interconnected by the third interference filter module and each of the pair of interference filter modules interconnecting two reflection grating modules.

11. In an optical wavelength-division multiplex system according to claim 1, wherein each interference filter module interconnects two reflection grating modules.

12. In an optical wavelength-division multiplex system with a multiplexer unit, a demultiplexer unit, and means for forming a transmission path between the two units, the improvement comprising both the multiplexer unit and the demultiplexer unit each having at least two reflection grating modules interconnected by an interference filter module, the reflection grating modules and interference filter modules of each unit being matched to one another, the reflection grating modules of the multiplexer unit having input fibers which have a smaller core diameter and a smaller numerical aperture than the remaining fibers of the system, and the reflection grating modules of the demultiplexer unit having output fibers with a larger core diameter and a higher numerical aperture than the other fibers of the system.

13. In an optical wavelength-division multiplex system according to claim 12, wherein the means for forming a transmission path between the units includes system fibers, and wherein the interference filter modules for both the multiplexer unit and the demultiplexer unit have fibers which are identical to the system fiber type, wherein the each reflection grating module of the multiplexer unit have output fibers which are identical to input fibers of the reflection grating modules of the demultiplexer unit and to both the fibers of the interference filter modules and the system fibers.

14. In an optical wavelength-division multiplex system according to claim 12, wherein each of the reflection grating modules of the multiplexer unit has a plurality of input ports having input fibers and a single output port with an output fiber, each of the reflection grating modules of the demultiplexer unit has a single input port with a single input fiber and a plurality of output ports with output fibers, each of the interference filter modules having at least three fiber ports with one of the fiber ports being connected to a system fiber of the means for forming a transmission path and the other two ports being connected by fibers extending to the reflection grating modules.

15. In an optical wavelength-division multiplex system with a multiplexer unit, a demultiplexer unit, and means for forming a transmission path between the two units, the improvement comprising both the multiplexer unit and the demultiplexer unit each having at least two reflection grating modules interconnected by an interference filter module, the reflection grating modules and interference filter modules of each unit being matched to one another, each of the reflection grating modules of the multiplexer unit having a plurality of input ports having input fibers and a single output port with an output fiber, each of the reflection grating modules of the demultiplexer unit having a single input port with a single input fiber and a plurality of output ports with output fibers, each of the interference filter modules having at least three fiber ports with one of the fiber ports being connected to a system fiber of the means for forming a transmission path and the other two ports being connected by fibers extending to the reflection grating modules, and the fibers of the interference filter modules of both the multiplexer unit and the demultiplexer unit, the input fibers of the reflection grating modules of the demultiplexer and the output fibers of the reflection grating modules of the multiplexer unit being identical to the system fiber utilized by the means for forming a transmission path.

16. In an optical wavelength-division multiplex system according to claim 15, wherein the input fibers for each of the reflection grating modules of the multiplexer unit have a smaller core diameter and smaller numerical aperture than the remaining fibers of the system and wherein the output fibers of each of the reflection grating modules of the demultiplexer unit have a larger core diameter and a higher numerical aperture than the remaining fibers of the system.

* * * * *